US012746454B2

(12) United States Patent
Van Raam

(10) Patent No.: US 12,746,454 B2
(45) Date of Patent: Sep. 29, 2026

(54) SPORTS FIELD AND METHODS FOR FORMING AND OPERATING THE SAME

(71) Applicant: Dutchblue World B.V., Amsterdam (NL)

(72) Inventor: Carolus Hermanus Van Raam, Amsterdam (NL)

(73) Assignee: DUTCHBLUE WORLD B.V., Amsterdam (NL)

( * ) Notice: Subject to any disclaimer, the term of this patent is extended or adjusted under 35 U.S.C. 154(b) by 632 days.

(21) Appl. No.: 17/309,289

(22) PCT Filed: Nov. 20, 2019

(86) PCT No.: PCT/NL2019/050760
§ 371 (c)(1),
(2) Date: May 14, 2021

(87) PCT Pub. No.: WO2020/106145
PCT Pub. Date: May 28, 2020

(65) Prior Publication Data

US 2022/0008812 A1 Jan. 13, 2022

(30) Foreign Application Priority Data

Nov. 20, 2018 (EP) .................................... 18207290

(51) Int. Cl.
*E01C 3/00* (2006.01)
*A63C 19/00* (2006.01)
(Continued)

(52) U.S. Cl.
CPC ................ *A63C 19/00* (2013.01); *B32B 5/18* (2013.01); *B32B 5/245* (2013.01); *E01C 3/006* (2013.01);
(Continued)

(58) Field of Classification Search
CPC ........... A63C 19/00; B32B 5/18; B32B 5/245; B32B 2266/06; B32B 2307/56;
(Continued)

(56) References Cited

U.S. PATENT DOCUMENTS 3,661,687 A * 5/1972 Spinney, Jr. ............ E01C 13/08 428/17
4,882,208 A * 11/1989 Breitscheidel .......... E01C 13/08 428/318.6
(Continued)

FOREIGN PATENT DOCUMENTS

ES 2364000 T3 * 8/2011
GB 2592150 A * 8/2021 ............ E01C 13/02
(Continued)

OTHER PUBLICATIONS

International Search Report from PCT/NL2019/050760 dated Mar. 10, 2020.

*Primary Examiner* — Raymond W Addie
(74) *Attorney, Agent, or Firm* — Quarles & Brady LLP

(57) ABSTRACT

Sports field (1), comprising abase structure (10) and a cover (13), wherein the cover is at least partly permeable to fluid, especially water, wherein the cover comprises a top layer (41) and a shock absorbing layer (38A) provided between the top layer and the base structure, wherein the shock absorbing layer has upper (38T) and lower (38L) surfaces and comprises manmade vitreous fibres (MMVF) bonded by a cured binder, wherein the shock absorbing layer has a thickness (D38) between the upper and lower surfaces of between 12 and 40 mm and has a density of between 175 kg/m$^3$ and 300 kg/m$^3$, wherein the shock absorbing layer is hydrophilic, such that it can absorb a volume of water of between at least 20 to 95% of the volume of the shock
(Continued)

absorbing layer. A method for forming a sports field and a method for operating a sports field are also disclosed.

33 Claims, 8 Drawing Sheets

(51) Int. Cl.
*B32B 5/18* (2006.01)
*B32B 5/24* (2006.01)
*E01C 11/22* (2006.01)
*E01C 13/02* (2006.01)
*E01C 13/08* (2006.01)
*E03F 1/00* (2006.01)

(52) U.S. Cl.
CPC ............ *E01C 11/225* (2013.01); *E01C 13/02* (2013.01); *E01C 13/08* (2013.01); *E03F 1/005* (2013.01); *B32B 2266/06* (2013.01); *B32B 2307/56* (2013.01); *B32B 2307/726* (2013.01); *B32B 2307/728* (2013.01); *B32B 2410/00* (2013.01); *E01C 2201/20* (2013.01)

(58) Field of Classification Search
CPC ........ B32B 2307/726; B32B 2307/728; B32B 2410/00; E01C 3/006; E01C 11/225; E01C 13/02; E01C 13/08; E03F 1/005
USPC ................................................ 404/17, 31–46
See application file for complete search history.

(56) References Cited

U.S. PATENT DOCUMENTS

| | | | | | |
|---|---|---|---|---|---|
| 4,946,719 | A * | 8/1990 | Dempsey | B32B 3/266 428/17 |
| 5,437,698 | A * | 8/1995 | Furukawa | E03F 1/005 52/302.1 |
| 5,514,722 | A * | 5/1996 | Di Geronimo | C08L 9/00 524/871 |
| 8,353,640 | B2 * | 1/2013 | Sawyer | E01C 11/225 404/31 |
| 9,986,693 | B2 * | 6/2018 | van Raam | A01G 9/1423 |
| 10,208,434 | B2 * | 2/2019 | van Raam | E01C 13/02 |
| 10,238,084 | B2 * | 3/2019 | van Raam | B25J 11/0085 |
| 10,844,552 | B2 * | 11/2020 | van Raam | E01C 13/08 |
| 2014/0169877 | A1 * | 6/2014 | Reising | E01C 13/045 404/27 |
| 2015/0259863 | A1 * | 9/2015 | van Raam | E01C 13/02 404/34 |
| 2016/0319096 | A1 * | 11/2016 | Lisowski | C08J 9/0066 |
| 2018/0223485 | A1 * | 8/2018 | Bennett | E01C 3/006 |
| 2018/0332783 | A1 * | 11/2018 | De Vries | E01C 21/00 |

FOREIGN PATENT DOCUMENTS

| | | |
|---|---|---|
| WO | WO 2009/042346 | 4/2009 |
| WO | WO 2014/029873 | 2/2014 |
| WO | WO 2015/135972 | 9/2015 |
| WO | WO 2020/104523 | 5/2020 |

* cited by examiner

SPORTS FIELD AND METHODS FOR FORMING AND OPERATING THE SAME

RELATED APPLICATIONS

This application is a 35 U.S.C. § 371 national phase application of PCT/NL2019/050760 (WO 2020/106145), filed on Nov. 20, 2018, entitled "Sports Field and Methods for Forming and Operating the Same", which application claims the benefit of European Application No. 18207290.0, filed Nov. 20, 2018, which is incorporated herein by reference in its entirety.

The invention relates to a sports field structure. Furthermore the invention relates to a method for forming a sports field.

Sports such as for example but not limited to football, soccer and rugby, hockey, athletics, equestrian and others have traditionally been played on pitches covered by grass. These are costly to maintain since they are maintenance prone. They are moreover very susceptible to climate. For example they may become saturated with water or dry out due to sunshine and heat. Moreover, such pitches will easily be damaged.

In order to avoid these problems and allow a more intensive use of sports fields artificial sports fields have been developed, for example made of plastic material. They may be woven and/or non woven and can comprise for example artificial grass filaments, representing haulms. A filling material such as sand or rubber filler elements can be provided in between such filaments.

Traditionally such sports fields comprise a base, on which drainage pipes are positioned. Then a draining sand layer is provided over said pipes and a layer of lava stone over said layer of sand. On said lava layer an elastic base layer of rubber or the like can be provided, over which a layer of geo textile is placed, protecting the top layer. Then the top layer is provided, comprising a layer of artificial grass. This top layer may be glued or otherwise adhered to the geo textile. Filler elements may be provided on top of the artificial grass, subsiding between the filaments, for providing further stability.

Artificial sports fields are generally more durable and require less maintenance. A disadvantage of such artificial sports fields may be that they may heat up and get over heated. Such over heating may be detrimental to the top layer but also to the players and other people on the field. A heated top layer may negatively influence the players and may lead to scorching when for example a player falls or makes a sliding or the like movement on the field. In order to avoid such overheating these sports fields have to be sprayed with water regularly, sometimes even at intervals during and between games played on said field, in order to prevent overheating of the sports field, especially the top layer. To this end the sports field has to be provided with a spraying installation, for example with sprayers retractable into the field. Such installation is costly and prone to regular maintenance. Moreover the sprayers may influence the levelness of the sports field, at least locally, and may also make the surface slippery whilst wet. Moreover the spraying installation can only be used when the field is not in use.

Furthermore sports fields have to meet official regulations set by governing bodies such as the World Field Hockey Federation (FIH), the World Soccer Association (FIFA) or the American Football association (NFL) or similar sports associations. In order to meet these regulations it is known to include a shock absorbing layer, also referred to as shock pad between a top layer and a base. Such shock pad is designed to increase durability of the sports field and to provide damping. The shock absorbing layer will absorb part of the forces exerted on the top layer, thereby reducing the risk of injuries to the players.

WO2015/135972 discloses a sports field comprising a top layer and a base, wherein between the base and the top layer an intermediate layer is provided, through which water can be transported, not only for draining the sports field, but also for feeding water to the surface of the top layer for evaporation. This evaporation allows for cooling of the top layer. In this known sports field a water storage is provided in the base, which is fluidly connected to the intermediate layer through wick elements transporting water from the storage upward into the intermediate layer. The base layer is disclosed as being made of plastic substantially hollow boxes, connected to each other and providing for the water storage, which base is described as providing damping to the sports field, due to the inherent flexibility of the plastic boxes. It has been found that although this known sports field does indeed lead to cooling of the playing surface, damping of the sports field is not under all circumstances optimal.

An aim of the present disclosure is to provide for an alternative sports field structure. An aim of the present disclosure is to provide for a sports field structure in which the temperature of at least the surface can be controlled and/or regulated. An aim of the present disclosure is to provide for a sports field which is relatively easy to form and maintain. An aim of the present disclosure is to provide for a sports field which can be temperature regulated even during use. An aim of the present disclosure is to provide for a method for forming a sports field.

At least one of these and other aims is obtainable with a sports field structure and modules therefore according to this disclosure.

In an aspect this disclosure can be characterised by a sports field comprising a base structure and a cover, wherein the cover is at least partly permeable to fluid, especially water, wherein the cover comprises a top layer and a shock absorbing layer provided between the top layer and the base structure. The shock absorbing layer has upper and lower surfaces, and comprises man made vitreous fibres (MMVF) bonded by a cured binder and/or a cell foam, preferably open cell foam. The shock absorbing layer has a thickness between the upper and lower surface of preferably between 12 and 40 mm and preferably has a density of between 175 $kg/m^3$ and 300 $kg/m^3$. The shock absorbing layer is hydrophilic, such that it can absorb a volume of water of between at least 20 to 95% of the volume of the shock absorbing layer.

Preferably the shock absorbing layer or layers can retain a relatively large volume of water over a relatively long period of time, such that during a sports game performed on said sports field the shock absorbing layer can provide sufficient water to the surface for wetting the surface of the sports field and/or for evaporation for cooling. Preferably the shock absorbing layer has a relatively high hydraulic conductivity, such that water can be transported through the shock absorbing layer at a rate high enough to replenish the layer for water evaporated. Preferably such replenishing is provided for by a water supply provided near and/or under the sports field, such as a water mains, storage tank and/or open water.

In advantageous embodiments the base structure comprises voids for containing fluid. The base structure forms a substantially continuous deck supporting the cover. The top layer in embodiments comprises, is formed by or covered by an artificial sports layer, such as artificial grass, but can also be or comprise natural grass. At least a number of said voids may be in fluid communication with each other. Wick elements can be provided fluidly connecting at least a number of said voids with said cover for supplying fluid from said voids to said top layer.

In embodiments through the wick elements fluid, especially water, can be supplied to the cover, especially to and through the shock absorbing layer and to the top layer. The fluid can then regulate the temperature and humidity of the top layer, for example by evaporation. The fluid in the voids can for example be water such as rain water drained through the top layer, but it can also be fluid, especially water supplied in a different manner, for example from a storage tank or a mains. For example by regulating the amount of fluid in the void or voids and the number and type of wick elements the supply of fluid to the top layer can be controlled and/or regulated.

In embodiments at least one membrane on top of the modules can be fluid permeable, especially water permeable, such that fluid, especially water can pass through the membrane into and/or out of the module.

Preferably a membrane is attached to a relevant surface of the shock absorbing layer, for example the top surface and/or the bottom surface, such that the shock absorbing layer can be laid as in integral layer. Preferably the shock absorbing layer has a density and resilience and flexibility such that during normal use of the sports field by sporting players walking or running on the field the shock absorbing layer is only slightly compressed, preferably to a maximum extend at which no water is pressed from the shock absorbing layer through the cover layer onto the sports field's top surface.

In an aspect the present disclosure can be characterized by a method for forming a sports field, wherein a base structure is formed on which a shock absorbing layer is provided, on top of which a top layer forming a sports layer is placed or formed. As a shock absorbing layer an integral layer or combination of layers can be used having a density of between 175 kg/m$^3$ and 350 kg/m$^3$, and a thickness between 12 and 40 mm is used. The shock absorbing layer comprises at least man made vitreous fibres and a cured binder composition and/or a cell foam, preferably open cell foam, wherein the shock absorbing layer or combination of layers is hydrophilic.

The shock absorbing layer is designed such that it has a relatively large water retaining capacity, for example between 20% to 95% of its volume, such that during use a relatively large amount of water can be retained to be transferred to the top layer for evaporation. Moreover water falling on the top layer can easily be drained, by absorption by the shock absorbing layer.

In an aspect the present disclosure can be characterized by a method for operating a sports field having a sports layer provided on top of a shock absorbing layer, wherein during use the water content of the shock absorbing layer is regulated. The water content can be regulated between 20% and at least 95% in volume of the volume of the shock absorbing layer, preferably between 30% and 95%, more preferably between 40% and 95%, even more preferably between 50% and 95%.

In further elucidation embodiments of the present disclosure will be discussed, by way of example only, with reference to the drawings.

Figure 1:
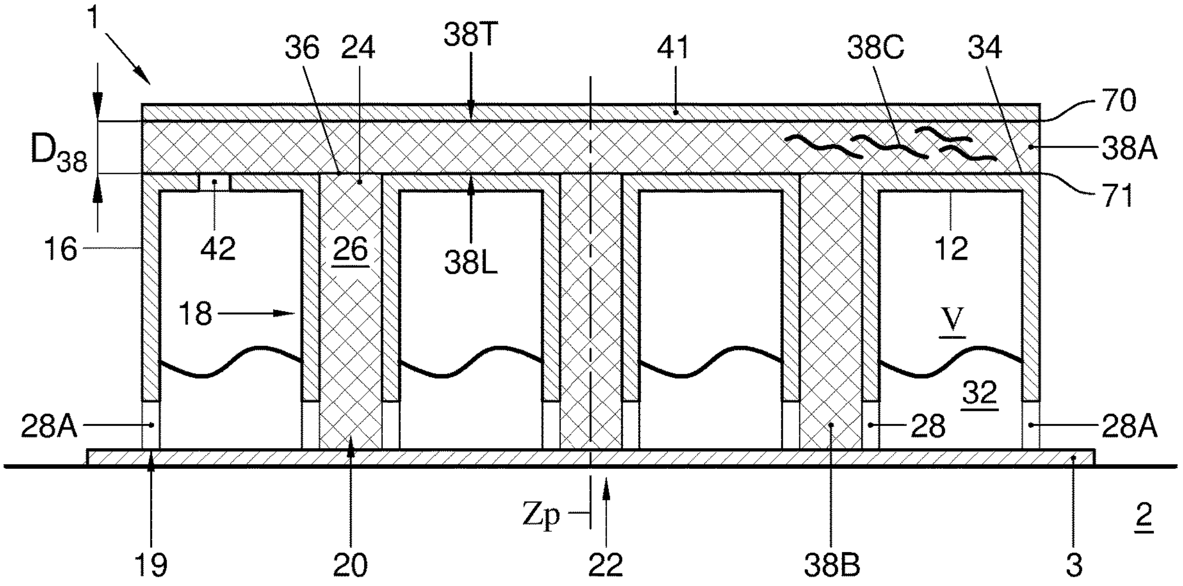
FIG. 1 shows in cross section schematically part of a sports field structure, comprising a base element with a deck and pillars, membrane and top layer.

In this description embodiments of the invention will be described with reference to the drawings by way of example only. These embodiments should by no means be understood as limiting the scope of the disclosure. At least all combinations of elements and features of the embodiments shown are also considered to have been disclosed herein. In this description the same or similar elements and features will be referred to by the same or similar reference signs.

In this description expressions of orientation such as top, bottom, vertical etcetera are used for convenience only and refer to the orientation of the sports field as seen in the accompanying drawings. Such expressions are not to be regarded as limiting the orientation of the sports field in use, and indeed, as will be described below, a base structure according to the description can be used in other orientations, including at least at sloping surfaces.

In this description a cover should be understood as meaning at least a layer or a set of layers of one or more materials, providing a surface for forming a sports field. Such cover may comprise or be formed by a cover layer. A cover according to the disclosure will comprise at least a shock absorbing layer and a top layer. A surface of the cover forms a surface for performing sports on.

In this description a top layer or a surface of the cover has to be understood as at least meaning any material or mixture or combination of materials and/or elements or structures, which may be partly or entirely artificial, suitable as a surface for sports, such as but not limited to grass, artificial grass or turf. Such top layer or surface can be woven or non woven and can comprise one or more integrated and/or separate layers. A top layer or surface can be formed by any suitable such sports field top layer such as for example Astroturf, GreenFields marketed by Ten Cate, The Netherlands, Desso, KSP, XtremeTurf, marketed by ACT Global Sports, and similar layers and materials, or a type of layer suitable for athletics, such as Regupol, marketed by BSW, Germany, preferably fulfilling the requirements of for example DIN 18035-6. A top layer is preferably relatively flexible and may be placed from a roll or in sheets. A top layer can be integral with a shock absorbing layer as to be described or can be a separate layer.

In this disclosure fibers as enclosed in the at least one shock absorbing layer can be any suitable type of fiber or combination of fibers, which may be chosen from the group of at least comprising stone wool or glass wool fibers, rockwool, coconut fibres, cotton or other fibre material ceramic fibers or the like. The fibers can be referred to as MMVF fibers. The fibers are preferably embedded in and/or connected by a hydrophilic cured binder, making the layer an integral layer which can for example be formed as a roll or mat. The structure and composition of at least the shock absorbing layer and preferably the cover is preferably such that water transport through at least the shock absorbing layer and preferably through the cover is enabled by at least capillary action.

A shock absorbing layer in a sports field according to the disclosure can also be formed by or using a cell foam, especially an open cell foam which may or may not comprise fibers, for example as discussed in the previous paragraph. A cell foam can for example be or comprise a (poly)urethane (PU) based cell foam and/or olefin based open cell foam. The term "polyurethane" as used herein shall include those polymers including urethane groups therein and thus includes at least urethane, polyurethane/polyurea polymers, unless the context dictates otherwise. The cell foam can for example be or comprise polyether, polyester, graft polyol foam, or in general hydrophilic foam. In embodiments in which fibers are provided in the cell foam, the fibers preferably have an average length and distribution that fibers, preferably substantially all fibers, extend across at least one wall portion between cells in such embodiments also partly closed cell foam could be used, in which the fibers can provide for transport of water between cells.

In embodiments the shock absorbing layer can comprise different sections having different structures, for example sections having a higher or lower porosity, higher or lower water retaining capacity, higher or lower fiber content, higher or lower hydrophilicity and/or higher or lower density than an adjoining or surrounding section or sections, such that for example water transport through the shock absorbing layer is influenced and/or evaporation is controlled even better.

In this description a wick element or wick medium is to be understood as at least including any material or element suitable for transporting fluid, especially water, from a water reservoir, such as a void below the cover into the cover, preferably by at least capillary action. The transport may preferably be achieved passively, i.e. without the necessity of a pump or such mechanically means for transporting the fluid from said water reservoir to the top layer. Suitable wick mediums can for example be but are not limited to soil, mixtures of soil and fibres and/or pellets, artificial or natural fibre materials such as but not limited to glass-, stone- or rockwool, coconut fibres or the like, cotton or other fibre material. In this description a substructure has to be understood as any artificial or natural surface on which modules according to the description can be placed and supported, either directly or indirectly, such as but not limited to ground, soil, sand, clay or such natural surfaces, or roofs of buildings, or concrete, tarmac, brick or such artificial surfaces. A base structure can be formed by or comprise such substructure.

In this description membrane has to be understood as including but not limited to any kind of woven or non woven sheet or foil, made of any plastic or natural material or mix of materials, including but not limited to plastic sheet or foil, natural fibers, geo-textiles, water permeable and/or water impermeable materials and the like. Preferably the membrane will be flexible, such that it can be placed from a roll or as relatively large sheets, compared to the sizes of the modules to be described. However, the membrane can also be provided in different ways, for example as tiles or as an in situ coating.

Figure 2:
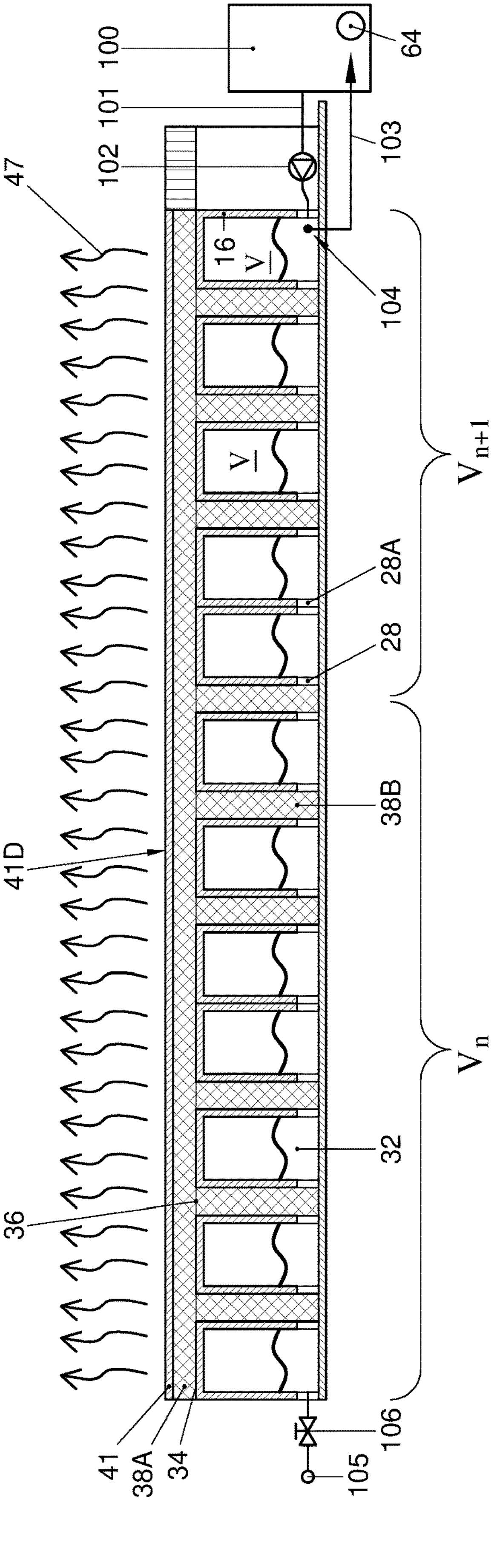
FIG. 2 shows in cross section schematically a series of sports fields structures, interconnected and forming a sports field area.

FIGS. 1 and 2 show schematically in a cross sectional side view a sports field structure 1 according to this disclosure, in a first embodiment, comprising a base element 10 comprising a deck 12 forming a top wall, and can be provided with side walls or a peripheral side wall 16 extending down from a peripheral edge 14 of the deck 12. The deck is carried by a series of pillars 18 extending from the deck 12 downward. The base element or module 10 can be positioned on a substructure 2, such as bed of sand or soil, on a floor such as a concrete floor, or on any suitable substructure, such that lower ends 20 of the pillars 18 and/or the lower ends 19 of the wall or walls 16 rest on the substructure 2 or a layer 3 provided thereon. Preferably both the wall 16 and at least a number of and more preferably all pillars 18 support the module 10 on the substructure, such that a more even distribution of forces between the deck 12 and the substructure 2 is obtained. A cover 13 is carried on the deck 12, providing a surface 41A forming a sports field or part thereof.

Figure 1A:
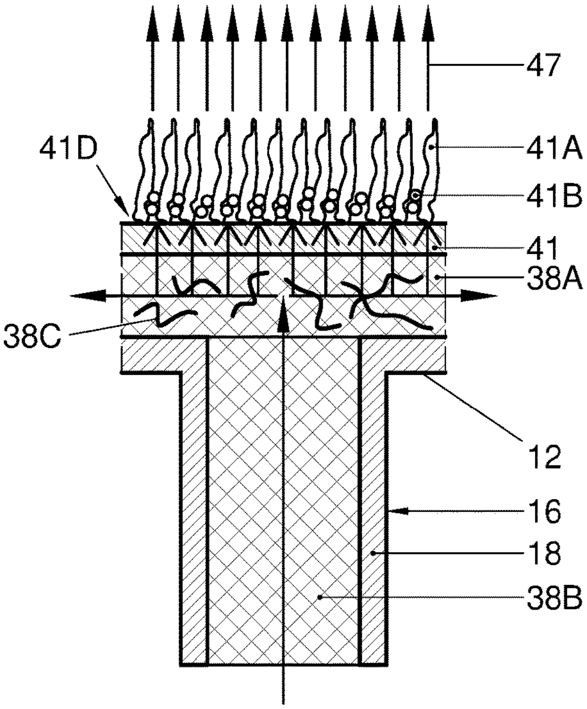
FIG. 1A shows a connection between a pillar and a wick element or wick material inside such pillar and a cover in a structure according to the disclosure.

FIG. 1A shows at an enlarged scale part of a cross section.

In this embodiment the module 10 is largely open at a bottom side 22. On the substructure 2 a membrane or layer 3 can be provided, such as for example a sheet of fabric or plastic foil or any other suitable membrane. Such layer can for example be a geo-textile. In embodiments the layer can be a water impermeable layer, preventing water from flowing out of the modules into the substructure or vice versa. In embodiments the layer 3 can be used for preventing movement of the substructure, such as for example preventing erosion of the substructure 2. In embodiments the layer can be provided for covering the substructure 2 in order to prevent for example chemicals to enter into the modules 10, which can for example be beneficial when the modules are used for covering polluted areas such as but not limited to waste land, garbage areas or the like. Alternatively the layer 3 can prevent fluids from entering into the substructure undesired. Thus the structure can be used in environments wherein for example products are used that can be detrimental to the substructure or should be prevented from entering into a surface material or an eco system, such as entering into ground water.

As can be seen in FIGS. 1-6 and 8 at least some of the pillars 18, which can also be referred to as columns, have a substantially open top end 24 in the deck 12. In the embodiment shown it can be seen that the pillars 18 as such are hollow and form a substantially open channel 26 between the open top end 24 and the lower end 20. As will be described some or all of the pillars 18 can be filled partly or entirely with a wick material 38B or wick element 39 and/or can have a closed lower end.

In the embodiments shown the pillars 18 can have any suitable cross section perpendicular to their longitudinal axis Zp, for example but not limited to a circular, square, rectangular or polygonal cross section. The cross section can be substantially the same over the longitudinal length of the pillar, seen along the axis Zp, but the cross section can also vary. The pillar can for example be partly or entirely conical, for example such that it has a draft suitable for injection moulding or a stronger draft. Suitable shapes and dimensions will be directly apparent to the skilled person. The modules 10 are preferably made integrally, including the pillars 18, deck 12 and walls 16, for example by injection moulding. Alternatively they can be assembled from different parts.

The pillars 18 can be provided with one or more openings 28 extending through the wall 30 of the pillar 18, connecting the channel 26 with an internal volume V of the module 10. In this embodiment the internal volume V is enclosed between the deck 12, the side wall or side walls 16 and the substructure 2, between the pillars 18. In the embodiment shown in FIGS. 1, 2 and 3 the openings 28 are provided near or at the lower ends 20, close to or directly adjacent the substructure 2. However openings 28 can be provided in any suitable position, for example at different longitudinal positions between the lower and top ends 20, 24. Similar openings 28A can be provided in the side wall or peripheral wall 16. Such additional openings 28A can also be provided at different positions along the wall or walls 16, for example at different heights.

In FIGS. 1 and 2 schematically a volume or body of water 32 is shown in the internal volume V of the module 10. The substructure 2 and/or the layer 3 can at least partly close off the open bottom side 22 of the module 10, such that the body of water 32 can be retained inside the internal volume V for an extended period of time. In such embodiments the internal volumes V of adjacent modules can be in communication with each other, for example through the openings 28A in the walls 16, such that these internal volumes V effectively form an integrated internal volume. This can be beneficial for obtaining a desired distribution of water through an array of such modules, as will be explained. By specific positioning the openings 28A can act as weirs, defining a water level in a module before water can flow over to an adjacent module 10 through such opening 28A.

As can be seen in for example FIGS. 1, 2, 3 and 8 the cover 13 is provided placed on top of the deck 12, covering the deck 12 at least partly and preferably entirely. A layer 34 can be provided over the deck, which may be a closed sheet or foil covering the entire deck 12. The layer 34 can for example be made of or with fabric, and can be resilient. The layer 34 can for example be an artificial layer made of a flexible plastic or rubber material. The layer 34 can for example be a layer as ordinarily used in known artificial sports fields directly below the cover layer. The layer 34 can be referred to and/or formed as or comprise a membrane. Preferably the layer 34 is at least permeable for water.

Figure 3:
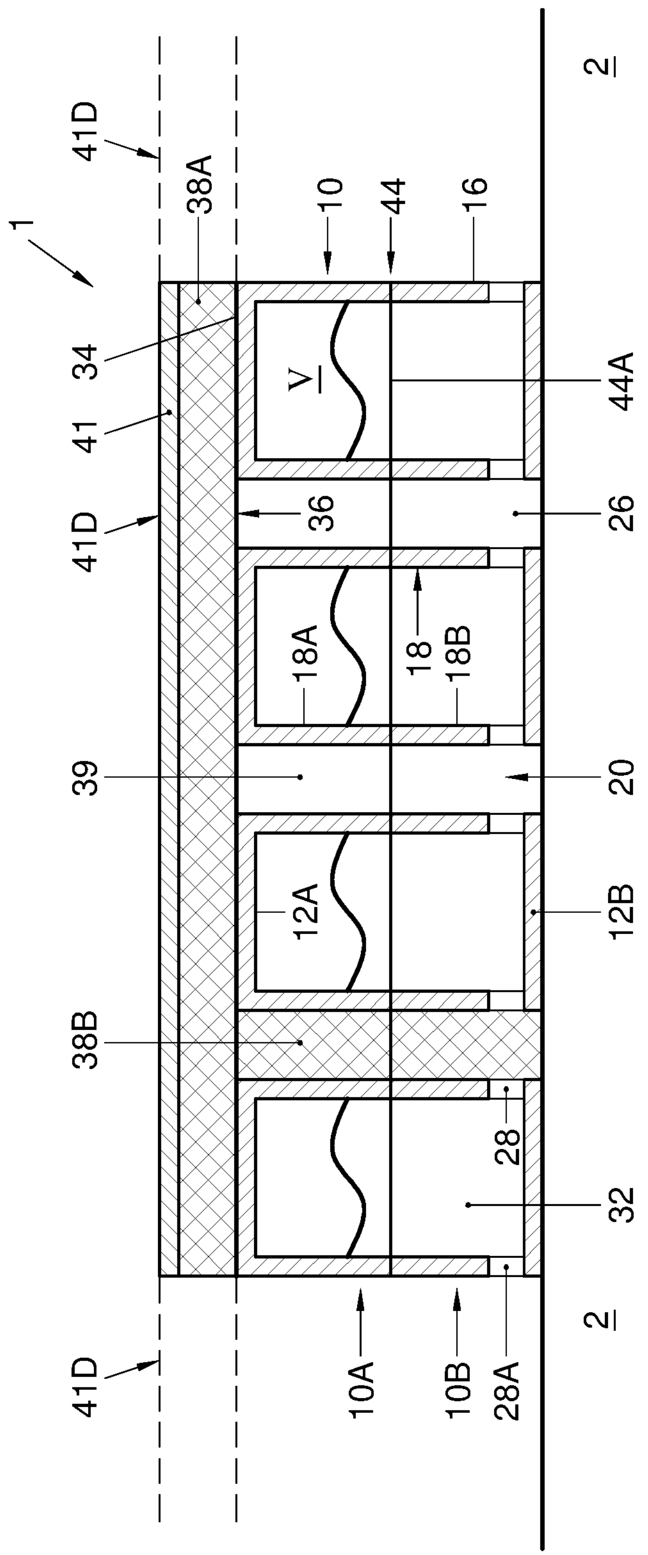
FIG. 3 shows in cross section schematically an alternative embodiment of a sports field structure, wherein the base element comprises or is formed as a substantially box shaped module with an internal volume for retaining water and/or allowing water and/or air flow.

As is shown in FIGS. 1, 2 and 3 on the layer 34 or directly on the deck 12 the cover 13 is provided, which comprises at least one shock absorbing layer 38A and the top layer 41. In the channels 26 of at least a number of the pillars 18 an amount of a wick medium 38B is provided, forming a wick element 39, which can be directly or indirectly in communication with the shock absorbing layer 38A through the open ends 24. In embodiments material of the shock absorbing layer 38A can be the same as the wick medium 38B inside the channels 26. In other embodiments they can be different in for example material, consistency, compactness or other such aspects.

In embodiments the shock absorbing layer 38A can be provided on top of the membrane 34 or directly on the deck 12, and can for example be an integral layer such as a mat or foil, can be provided as segments or can be loose material, or combinations thereof. The shock absorbing layer 38A has an upper surface 38T and a lower surface 38L.

In embodiments the shock absorbing layer 38A can comprise man made vitreous fibres 38C (MMVF) bonded by a cured binder. The shock absorbing layer 38A preferably has a thickness $D_{38}$ between the upper and lower surface 38T, 38L of between 12 and 40 mm, although it can be thicker or thinner for specific applications, and preferably has a density of between 175 kg/m$^3$ and 300 kg/m$^3$, although it can have a lower or higher density for special applications.

In embodiments the shock absorbing layer 38A can comprise or be formed of cell foam, especially open cell foam, such as but not limited to (poly)urethane, olefin, polyether, polyethene, polyester, graft polyol foam, or in general hydrophilic foam. Fibers 38C, such as but not necessarily limited to as discussed here above can be dispersed throughout the shock absorbing layer or part(s) thereof, preferably such that fibers extend through at least parts of different cells and cell separating walls, such that they can enhance water transport between cells.

The shock absorbing layer 38A is hydrophilic, such that it can retain a relatively large volume of water, preferably a volume of between at least 20 to 95% of the volume of the shock absorbing layer 38A. Preferably absorption of water does not or not significantly change the volume of the shock absorbing layer, preferably at least not more than 20%, more preferably at least not more than 15% and for example not more than 10%.

The fibres 38C can have different effects in the layer 38A, either one of these effects or some or all in combination. The fibres 38C can aid in providing a consistency and stability of the layer 38A, especially when the layer 38A has been wetted substantially and/or when the layer 38A comprises or consists of relatively loose material. The fibres 38C will aid in water retention and distribution through the layer 38A for example by capillary action. The fibres 38C can aid in transportation of water through the cover 13, from the pillars 18 to and through the cover, especially the shock absorbing layer or layers 38A and the top layer 41 and/or vice versa. The fibres 38C can aid in specific distribution and retention of water over the field. For example by providing more fibres 38C in a specific area than in an other area the area with a higher fibre concentration may receive more water from the structure and/or prevent more water flowing back into the structure, which may lead to a higher evaporation in such area than in other areas with a lower fibre concentration.

The shock absorbing layer 38A preferably is provided with a first membrane 70 on the upper surface 38T and/or a second membrane 71 at the lower surface 38L, preferably both the first and second membrane 70, 71. The or each of the first and second membrane 70, 71 is preferably bonded to the relevant upper or lower surface 38T, 38L, such that it forms an integral part of the shock absorbing layer 38A. The or each membrane 70, 71 is water permeable and can for example be a mesh. The or each upper and/or lower membrane 70, 71 is preferably made of a material such that it has a higher point load bearing capacity than the shock absorbing layer material, such that a point load provided on the shock absorbing layer will be distributed over a larger area through the relevant upper and/or lower membrane 70, 71.

As discussed here before, the shock absorbing layer preferably has a membrane attached to a relevant surface of the shock absorbing layer, for example the top surface and/or the bottom surface, preferably both, such that the shock absorbing layer 38A can be laid as an integral layer.

Preferably the shock absorbing layer 38A has a density and resilience and flexibility such that during normal use of the sports field by sporting players walking or running on the field the shock absorbing layer is only slightly compressed, preferably to a maximum extend at which no water is pressed from the shock absorbing layer through the cover layer onto the sports field's top surface.

As can be seen in the drawings, the wick medium 38B and/or element 39 present in the pillars 18 can be in contact with the volume of water 32 inside the modules 10 through the opening or openings 28, as well as with the shock absorbing layer 38A on top of the layer 34, for example through said layer 34, or on top of the deck 12. Thus water will be transported from the volume of water 32 to the shock absorbing layer through the wick medium 38B or element 39 inside the channels 26. This will preferably be a natural transport such that any water removed from the shock absorbing layer 38A, for example by evaporation, drainage or otherwise, will be replenished from the volume of water 32 in a suitable pace. This pace can for example be influenced by the number of and distribution of the pillars 18 filled with the wick medium or element 39 or more in general the number and distribution of wick elements, the amount and type of wick medium inside the pillars, the longitudinal depth to which extend the channels is or are filled and the size and distribution of the openings 28 and the hygroscopic properties of the materials, especially of the shock absorbing layer 38A and possibly the layer 34, if any.

The top layer 41 can comprise filaments 41A and filler material 41B, for example sand or rubber or plastic elements, as shown e.g. in FIG. 1A, which can form part of the surface 41D.

In FIG. 2 by way of example a system is shown for regulating the water level inside the internal volume V. At the right hand side a storage tank 100 is shown, connected to the volume V by a first line 101, comprising a pump 102, and a second line 103, having an inlet 104 in connection with the volume V. The inlet 103 preferably comprises or is formed by a settable end, such that the inlet can form an overflow at a desired level of water inside the volume V, thus acting basically as a weir. Any water entering into the volume V, for example due to rain, will raise the water level inside the volume V. If said level rises above a set, desired level, water will flow through the inlet 103 and second line 103 into the tank 100. If the level of water sinks below the desired level water can be supplied from the tank 100 through the first line 101 and the pump 102. A suitable water level sensing unit can be provided in a known manner, for example a float, syphon or the like. Such systems are well known in the art. At the left hand side a water mains 105 is shown, connected to the volume V. Should at any time the water level inside the volume V get below a desired level, water can be supplied through the water mains, regulated by a valve 106. For example when there is an insufficient amount of water in the tank 100.

By regulating the water level in the volume V, the hydration of the layers 34, 38A and/or 41 can be regulated and thus for example evaporation and thus cooling and/or heating of the field can be regulated.

As is shown schematically in FIG. 1A by arrows W, water can be transported up from the volume V through the material 38B or element 39, preferably at least by capillary action and into the cover 13, especially the shock absorbing layer 38A, to be distributed through the cover 13. Then the water will flow up further, to the surface 41D and evaporate due to e.g. the heat of the surface 41D and/or air above it, wind or the like. Obviously water can also be transported in the opposite direction. Fibres 38C provided in the cover 13 may aid in transport and distribution of water.

Figure 8:
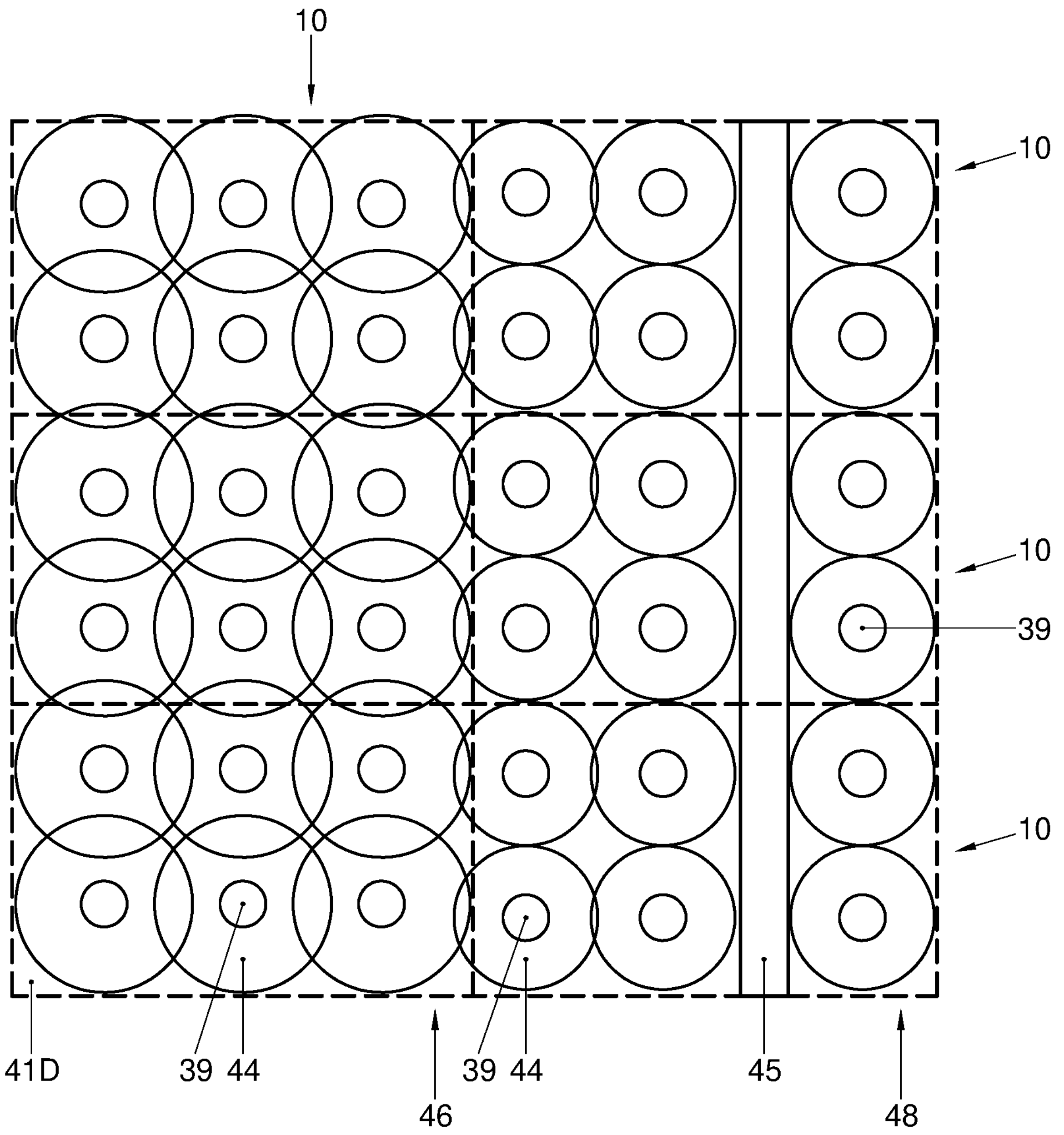
FIG. 8 shows in top view part of a sports field.

As can be seen in FIG. 8 during use water transported from the voids in the modules will be transported by the wick elements 39 and/or wick medium 38B to the shock absorbing layer 38A and will be distributed in and/or over said top layer and/or cover layer 41 over an area 40 surrounding an upper end of said wick element cq a pillar or channel in which such wick element is provided or formed by wick medium. For example by evaporation and/or by backflow into the voids the water will then retract heat from the cover layer 41. Alternatively water may be supplied in this manner in order to warm the shock absorbing layer 38A and/or cover layer 41, for example during cold periods. To this end the water could be heated, either inside the voids in the modules, or externally to the modules, for example in the tank 100. Moreover, since the water level inside the volume V can be regulated, an air space can be provided and/or maintained above the water, which air may be used for further cooling and/or heating of the top layer, and/or for ventilation thereof.

As discussed and known in the art, different international governmental bodies, such as FiFa, FIH and NFL have set specific standards for requirements to be met by their sports fields, and tests methods to be used for measurement, such as for example provided for in "Handbook of Performance, Durability and Construction Requirements for Synthetic Turf Hockey Pitches; FIH 2017, Annex C: Measurement Impact Response, using Berlin Artificial Athlete testing, method A or B" and "FiFa Quality Programme for Football Turf; handbook of Test Methods, (FiFa 2015)—FiFa test method 04a (shock absorption), 05a (Vertical deformation) and 13 (Energy of Restitution)". Sports fields according to the present disclosure surprisingly can fulfil these strict requirements and still provide for cooling by evaporation and proper drainage in order to avoid flooding.

The thickness D38 of the shock absorbing layer 38A is preferably between 12 and 40 mm, more preferably between 15 and 35 mm, such as for example between 18 and 28 mm, and most preferably between 20 and 22 mm, in order to optimize water management properties such as a volume of water which can be retained in the layer 38A and for meeting the requirements as set by the governing bodies for properties of sports fields, as discussed.

The density of the shock absorbing layer 38A is preferably between 175 $kg/m^3$ and 300 $kg/m^3$, more preferably between 220 $kg/m^3$ and 280 $kg/m^3$, even more preferably about 275 $kg/m^3$, in order to optimize water management properties such as a volume of water which can be retained in the layer 38A and for meeting the requirements as set by the governing bodies for properties of sports fields, as discussed.

The shock absorbing layer 38A can comprise a known curable, hydrophilic binder, for example 1.0 wt % to 6.0 wt % of cured binder composition, preferably between 2.5 wt % and 4.5 wt %, more preferably between 3.0 wt % and 3.8 wt %, in order to optimize stiffness and elasticity of the shock absorbing layer or layers 38A and optimize both water retention and transport of the layer 38A.

In general the shock absorbing layer 38A, which can as also be referred to as shock pad 38A, can be according to and/or can be made using a method as disclosed in the European application filed by ROCKWOOL International A/S on the same day, titled "Shock pad for artificial sports fields". Alternatively such shock absorbing layer can be made differently, from a different material, such as but not limited to materials comprising or based on MMVF fibres, cell foams and the like.

It has surprisingly be found that a sports field 1 according to the disclosure, comprising a shock pad or shock absorbing layer 38A according to the disclosure, provides for an optimal water retention capacity, water transport, elasticity, flexibility and firmness of the shock pad, in order to meet the requirements set by the governing bodies as described. It has been found surprisingly that the physical properties, especially the firmness, elasticity, shock absorbing capacity and vertical deformation of the shock absorbing layer 38A and therefore of the sports field as such is not significantly influenced by the amount of water retained in the shock absorbing layer. It has especially been found that with a shock absorbing layer according to the disclosure the requirements as set by the said governing bodies can be met with a water content between 20 and 95% in volume of the shock absorbing layer 38A.

Figure 4:
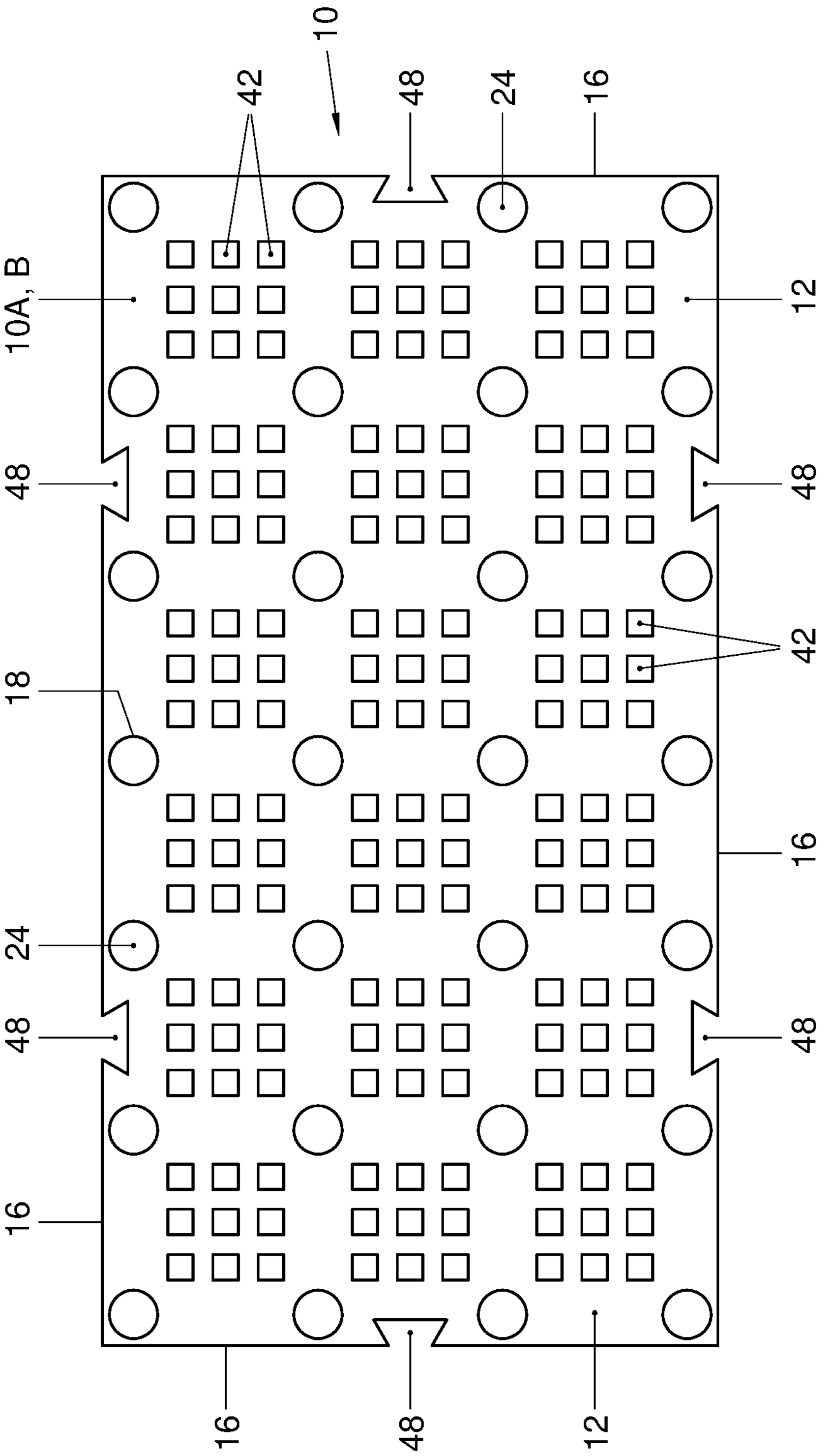
FIG. 4 shows schematically in top view a base element, in a first embodiment.
Figure 5:
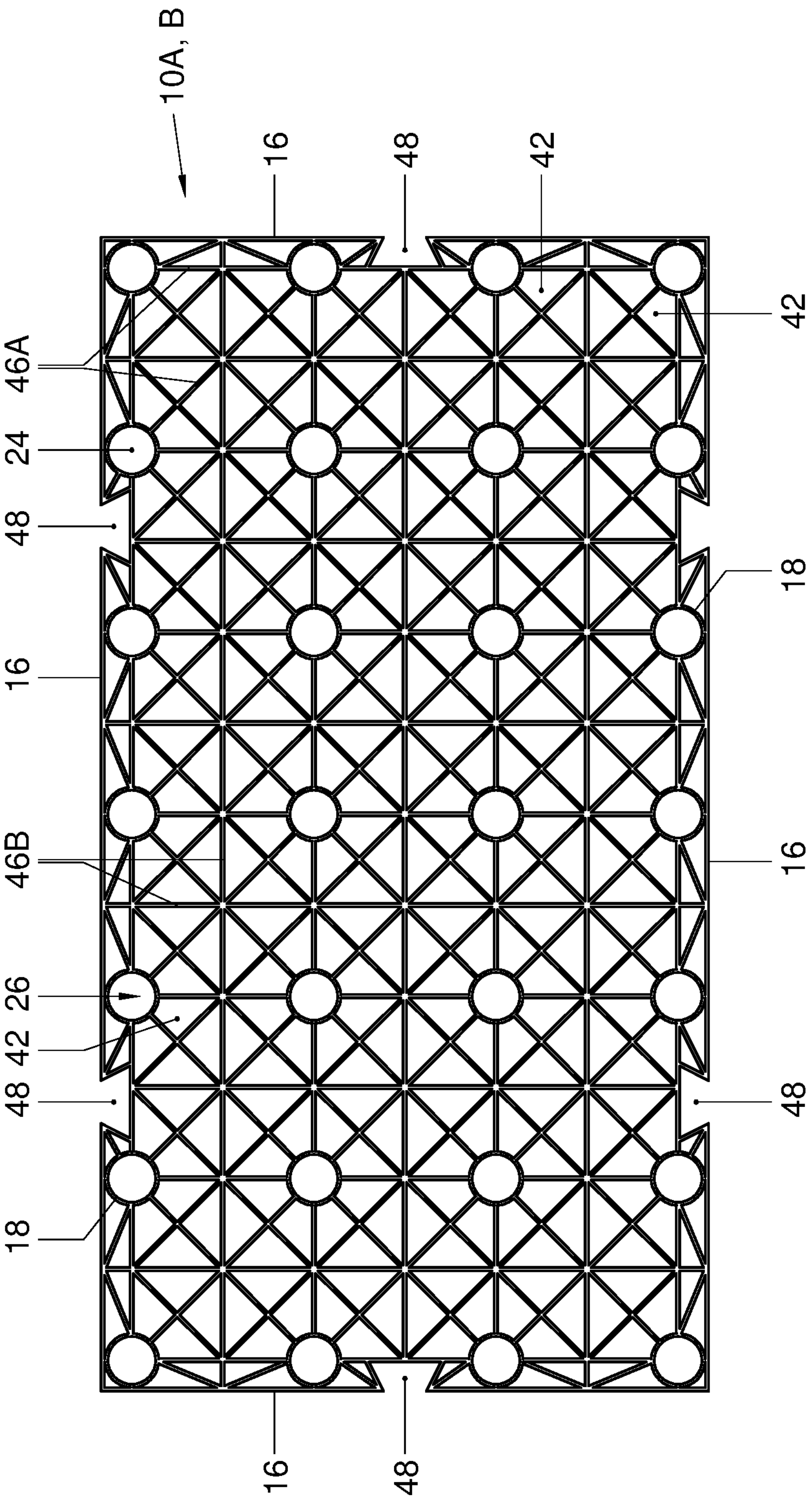
FIG. 5 shows schematically in top view a base element, in a second embodiment.
Figure 6:
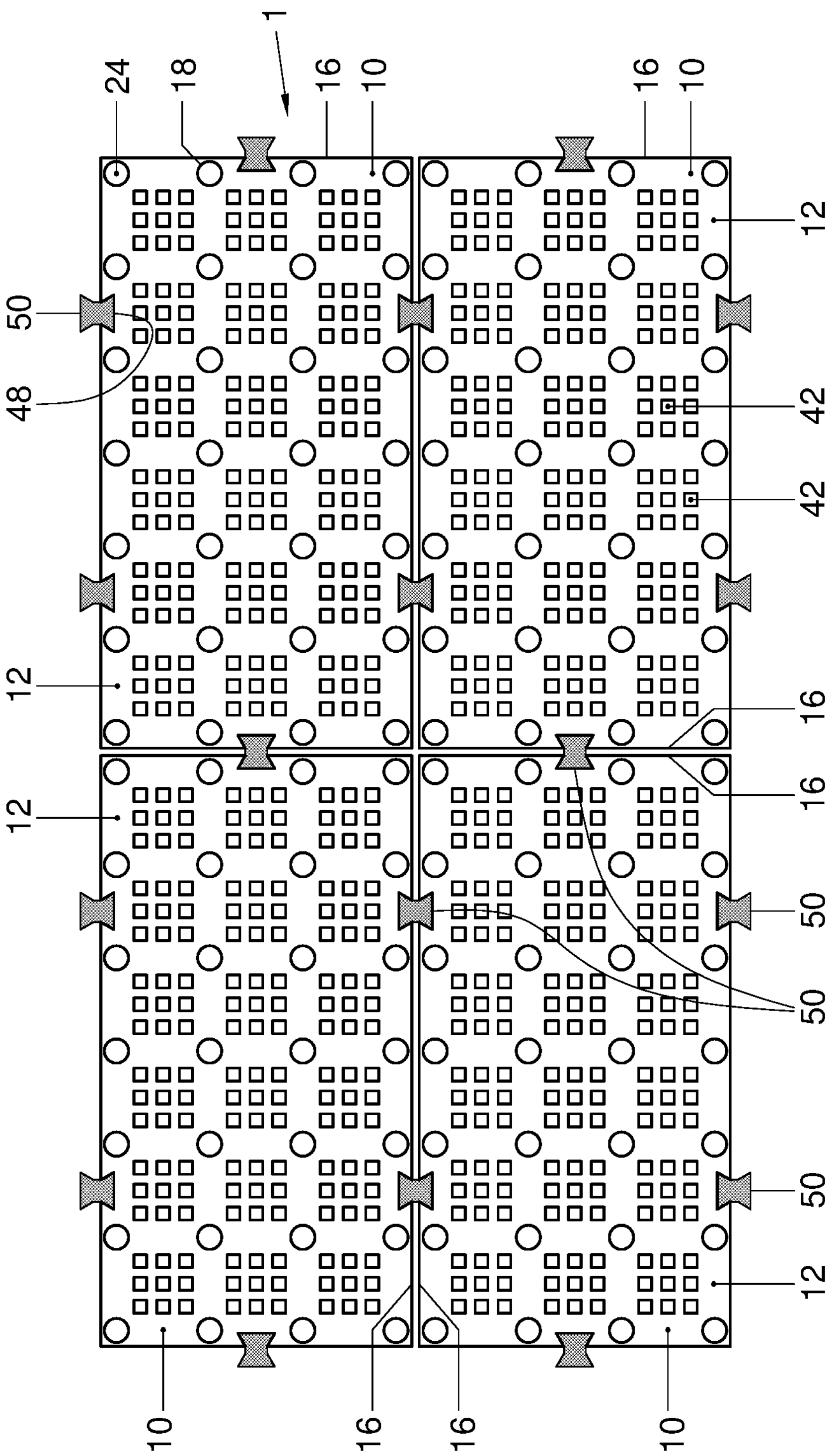
FIG. 6 shows schematically in top view a series of modules interconnected.

In embodiments the deck 12 can be provided with additional openings 42 extending into the internal volume V. These openings 42 can be covered by the layer 34, such that the shock absorbing layer 38A cannot pass into and through the openings 42. In FIGS. 4-6 embodiments of the modules 10 are shown in top view, showing open ends 24 of pillars 18 and openings 42. The layer 34 is preferably water permeable, such that water can pass from the layer 38A through the layer 34 and the openings 42 into the internal volume V of the modules 10, to be retained therein or to flow away. This allows the volume V to be filled with water from above, for example by rain or irrigation. Additionally or alternatively water from the internal volume can evaporate through the openings 42 and be absorbed by the fabric and/or the growing medium 38. Alternatively the structure can be used as a tidal system, by filling the modules by providing a flow of water through the modules, such that the water level rises, for example to a level close to or in the openings 42, or even to a level including most of or even all of the shock absorbing layer 38A and then draining the water again, at least to a level below the deck 12. By using a system of regulating the water level in the system, for example by flooding the volume V and/or the shock absorbing layer 38A, the water content of the shock absorbing layer 38A by absorption and retention can be regulated. For example the water content can be increased prior to or during use of the sports field, in order to increase cooling of the top layer 41 by allowing more water to evaporate, or heating by using heated water.

It has been found that by regulating the water level in the volume V and/or the shock absorbing layer 38, the water content of the shock absorbing layer 38 can be regulated accurately and quickly with a shock absorbing layer 38 according to the disclosure. By raising the water level the shock absorbing layer will absorb and retain more water, for example up to about 95% or more in volume at the maximum level, whereas by lowering the water level water will be allowed to drain from the shock absorbing layer 38, thus reducing the water content. At lower water levels water will be replenished more slowly in the shock absorbing layer.

The layer 34 can be air permeable, such that air can enter into the top layer 38A from below, for example through the openings 42, in order to aerate the top layer 38A and/or to cool and/or heat the top layer by cool or warm air blown through the modules. A natural or forced air flow could be provided through the modules 10 to promote such aeration or temperature regulation.

In FIG. 2 a series of modules 10 is shown, interconnected in a suitable way, for forming a larger area of a sports field 1. The decks of the modules 10 preferably form a flat and/or continuous surface area. The modules can be arranged in a matrix of rows and columns, as is for example shown in top view in FIG. 6 showing four modules 10, for covering any size and/or shape area. As discussed the internal volume V can be a continuous volume throughout the area or part thereof. Alternatively modules 10 could be provided with closed peripheral walls, that is free of openings 28A or such openings blocked, such that some or all of the modules have their own closed internal volume V. In general the wick element and/or medium 38B in the channel or channels 26 will lead to wetting of the shock absorbing layer 38A in a substantially circular area around the relevant opening 24. By strategic filling of some channels 26 and leaving others empty or partly empty a specific desired wetting pattern of the top layer 41 can be obtained, as for example shown in FIG. 8.

In embodiments the structure formed by the modules 10 can be divided up in different compartments, each compartment comprising one or more coupled modules 10 having a combined internal volume $V_n$, separated from the internal volume $V_{n+1}$ of the or each other compartment. Each compartment can be provided with a series of wick elements or columns filled with wick material, wherein the number or distribution of such elements or filled columns can vary between compartments, and/or wherein the wick material and/or capillary capacity can vary between the different compartments. Additionally or alternatively the different compartments can be arranged to have the water level and/or water temperature in each compartment set independent from the water level and/or temperature in adjacent compartments. In such embodiments different areas of the sports field 1 can be treated differently, for example by having the layers 34, 38A and/or 41 wetter, dryer, warmer or cooler than adjacent areas, providing for more evaporation in areas than in other areas, or providing similar differences. In such embodiments communications between different compartments may be impossible or may be possible for exchange of water and/or air. In case such communications are possible between compartments such communication may be regulated by for example valves, preferably such that an operator can actively set such communication.

In FIG. 3 schematically an alternative embodiment is shown, wherein the module or base element 10 is box shaped. In general this can be understood as that the module 10 is comparable to that as shown in FIG. 1, but is provided at the bottom side 22 with a bottom 12B. This could be a bottom element attached to the bottom 22 of the module 10 as disclosed and discussed with reference to FIGS. 1 and 2. In the embodiment shown in FIG. 2 the module 10 formed by connecting two module parts 10A, 10B over a connecting area 44 indicated in FIG. 3 by the line 44A. This connection can be made in any suitable way, either permanently or reversibly. The connection can for example be made by welding, gluing, clicking, screwing or any other suitable way known to the person skilled in the art. In the embodiment of FIG. 3 each part 10A, B comprises a part of a side or peripheral wall 16 and part of the pillars 18. The lower part 10B comprises a bottom 12B, similar to the deck 12, such that the module can be placed on a substructure supported at least largely by the bottom 12B.

In embodiments internally the module 10 can contain pillars 18 extending vertically between the deck and bottom 12, 12B which can aid in resisting vertical deformation or crushing of the module 10. In embodiments the module 10 can be assembled from two substantially identical integral components 10A, 10B moulded from a rigid plastics material and which are fitted one inverted on top of the other. Each pillar 18 thus comprises two half-pillars or male and female parts 18A, 18B respectively, one part being integral with one component 10A or 10B and the other part being integral with the other component 10A or 10B. In embodiments male parts 18A can alternate with female parts 18B in each component 10A and 10B such that when the two components are fitted together the male parts 18A of each component enter the respective female parts 18B of the other component to form the complete pillars 18. To avoid over insertion of the male parts into the female parts, and to maintain the top and bottom walls 12 and 14 at their correct separation, each male part can for example comprise a shoulder 18C which abuts against the open end 18D of the respective female part when the components 10A and 10B are fully engaged.

As shown in FIG. 4 the deck 12 and, if applicable, the bottom 12A of a module 10 can be formed by a sustainably closed plane comprising the openings 42 and open ends 24 of the pillars 18. In this embodiment the openings 42 have a substantially square cross section, but they can have any cross section desired, such as but not limited to round, oblong, polygonal or the like.

In FIG. 5 an alternative embodiment is shown, wherein the deck 12 and, if applicable, the bottom 12A can be formed substantially open. The deck 12 and/or bottom 12A can be formed substantially by a structure of intersecting ribs 46A, B extending between at least open ends 24 of pillars 18 and between open ends 24 of pillars and side walls 16 of the base element 10, and/or between other ribs.

In embodiments the bottom 12B can be according to FIG. 4 and the deck 12 could be according to FIG. 5 or vice versa.

As can be seen in FIGS. 4, 5 and 6 the module 10 can be provided with side wall channels 48, extending over part or all of the height of the module 10 or a module part 10A, B, which can have a cross section non-releasing in the direction of the relevant side 16 of the module. In the embodiment shown the side wall channels 48 have a substantially dove tail shape cross section. When two modules are appropriately placed next to each other, side walls 16 facing and abutting, at least two such side wall channels 48 will be adjacent to each other and open to each other, forming a substantially bow-tie or butterfly shaped joined channel. A locking element 50 having a shape complementary to the joined channels 48 can be press fit into said joined channels 48, locking the modules to each other. As can be seen several such channels 48 can be provided on all sides of the modules 10, assuring a very firm connection between all modules. Obviously other such locking elements 50 and complementary channels 48 could be provided or other means for coupling the modules.

The modules 10 can contain a network of bracing members to resist geometric deformation of the module in a horizontal plane and/or in vertical direction. The bracing members can for example be formed by the ribs 46A, B as shown in FIG. 5 and/or extend in a pattern as shown in FIG. 5, and can be internal within the internal volume of the module, for example below a deck 12 as shown in FIG. 4. The ribs 46A can for example extend parallel to a side wall or diagonally between pillars 18 and can comprise or form vertical webs having apertures to allow fluid flow horizontally through the module 10 in any direction. The webs can be orientated vertically such that they do not obstruct fluid flow in the vertical direction. Each rib and/or web can be formed of upper and lower halves integral with upper and lower components 10A, 10B respectively, and can have facing non-straight or at least not completely connecting edges, such as for example concave or wavy edges defining apertures between them. In embodiments the edges can be parabolic. Between the ribs 46A and/or webs further ribs 46B can be provided, which can also form or comprise webs extending into the inner volume V and can serve to break down voids within the volume V. As viewed from above in FIG. 5, they can extend substantially normally between the bracing ribs 46A and supplement the bracing effect of the latter. By way of example and not limiting the disclosure, in embodiments the ribs 46A, B can for example be a few millimeters thick, for example about 5 mm thick and can extend downward or upward from the deck 12 or bottom 12B in a direction normal to the page a few millimeters to several centimeters and can bridge about all of the internal height of the module.

As discussed before, the layer 34 could also be omitted, placing the shock absorbing layer 38A for example directly on the modules, or the layer 34 can be part of the shock absorbing layer 38A and can for example be the second, lower membrane 71.

The channel 26 can be provided with one or more restrictions, such as but not limited to flanges or ridges extending into the channel 26 from the wall 30, such that the wick medium is prevented from or at least restricted in falling further down the channel towards the end 20 thereof. The restrictions can limit the depth into which the wick medium can be inserted and prevent it from being pushed further clue to for example gravity, vibrations or impact pulses.

In general modules can be used as disclosed as structural modules in for example WO0214608, WO2011/007128 or WO2011/007127, all of which are considered to have been incorporated herein in their entirety as published, as far as the detailed description and the drawings are concerned.

Figure 7:
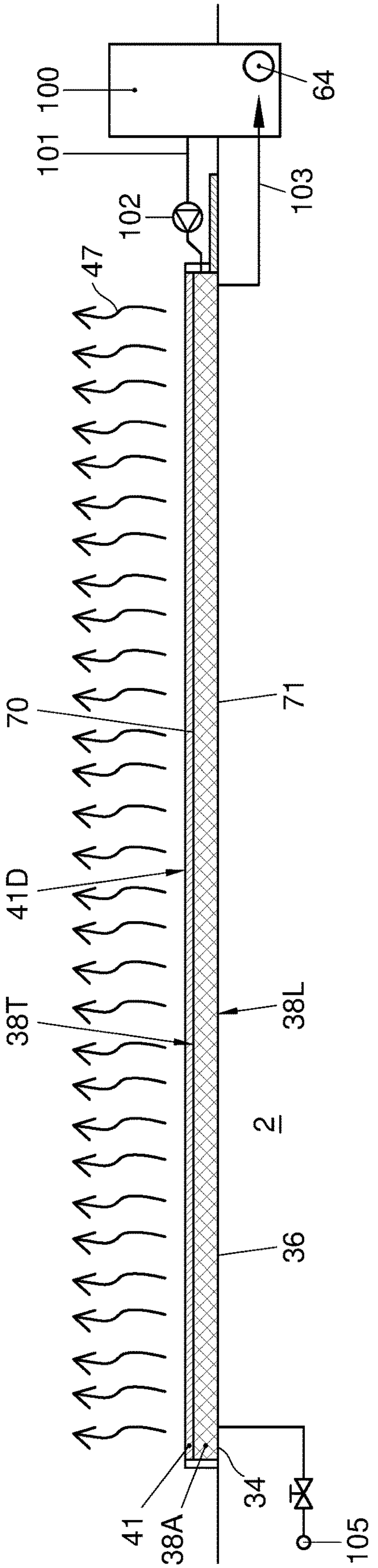
FIG. 7 shows schematically in cross sectional side view a base structure with a shock absorbing layer and a top layer, wherein a flooding provision is provided for regulating the water content of at least the shock absorbing layer.

FIG. 7 shows schematically a sports field 1 in cross section, comprising a base structure 2, a shock absorbing layer 38A and a top layer 41 forming the sports surface 41A, for example artificial grass, turf, elastomeric material or the like. A system for at least partly flooding the shock absorbing layer 38A is provided, such that the water content of the layer 38A can be regulated. Said system can for example comprise one or more of a pump 102 and a reservoir 100, a connection to a water mains 105 and a spraying installation as for example known in the art. With a traditional spraying installation and/or the system for partly flooding, water can be provided to the field prior to use of the field, which can then be retained to a desired high level of between 20 and 95%, preferably as high as possible, such that during use of the field it can evaporate, cooling the field and moreover providing, if desired, for wetting the sports layer 41, for example in order to improve performance, such as rolling of a ball. With a pump and/or water mains even during use of a field water can be supplied to the field in order to provide such cooling and/or performance effects. Preferably sides of the sports field, especially of the shock absorbing layers, are encased such that water is substantially prevented from flowing out of the shock absorbing layer 38 sideways, preventing undesired water loss. Such encasing can for example be provided for by a water impermeable membrane, plating, sealing or the like.

In FIG. 8 a series of modules 10 forming a surface structure is shown, from above, schematically showing a pattern of wetted circles 44 of the top layer 38A surrounding openings or wick elements 39. In FIG. 8, by way of example, schematically a side line 45 is shown, separating a playing area 46 of the field from a side area 48. By way of example the wetted circles 44 well in the playing area 46 are slightly larger than near and in the side area 47, for example by providing less wick material in the side area 48. Preferably the wick elements 39 or wick material 38B is provided in a regular pattern, depending on the desired wetting and evaporation, cooling and/or draining of a sports field area.

Similarly or additionally the shock absorbing layer 38A could be provided with areas (for example similar to said circles 44 in FIG. 8) having different material properties, for example sections having a higher or lower porosity, higher or lower water retaining capacity, higher or lower fiber content, higher or lower hydrophilicity and/or higher or lower density than an adjoining or surrounding section of sections (for example similar to the areas between the circles 44 in FIG. 8), in order to influence for example water retaining and transport properties, evaporation and the like, and/or for example local density, shock absorption, resilience and the like.

According to the disclosure a sports field surface structure or area can be formed by placing a series of modules 10 on a substructure. Preferably the modules 10 are coupled in rows and/or columns. Said modules 10 comprise a deck 8 and columns 18 opening into said deck 8. A series of said columns 18 is filled at least partly with a wick medium 38 or wick elements 39. On top of the modules 10 a shock absorbing layer 38A is provided, in fluid connection with the wick medium 38B or element 39 in the or each column 18 filled at least partly with said wick medium 38B or element 39. Water is provided or retained in said modules 10 for hydration of the shock absorbing layer 38A on top of the modules through the wick medium 38B or element 39 in said columns 18 and/or for draining water from the shock absorbing layer 38A on top of said modules 10, To this end for example water can be flushed into and/or from said coupled modules, for example from a side of a series of modules. In embodiments water can be provided from the top, for example by rain and/or sprinklers or such artificial raining devices and/or by a tidal system, wherein part of the water can be retained inside the modules for later use. In embodiments water can be provided from a tank 100 and/or a mains 105. Water contained in the layer 34, top layer 38*a* and/of cover layer 41 can then evaporate from the cover layer 41, as symbolically shown in FIGS. 1A and 2 by arrows 47, thereby cooling the surface of the cover layer 41. By providing more or less water in the layers 34, 38A and/or 41 the evaporation can be regulated, such that the temperature of the surface of the cover layer can be regulated at all times, to a high degree relatively independent from for example air temperature above the surface, radiation by the sun, shadow and the like factors external to the field structure. For example for a field in a stadium a part of the field directly in the sun can be cooled more intensive than a part of the field in the shadow of the stadium, which may change during a day. Thus for example in the morning a first part of the field may be cooled more intensively by providing more water to evaporate than another part of the field, whereas later in the day the same first part of the field may experience the shadow of the stadium and will then be cooled less, whereas the other part may have to be cooled more intensive because of it becoming exposed to direct sun light. Thus the temperature of the surface of the cover layer 41 and thus of the field can be kept within limits and temperature differences over the field can also be kept minimal.

In embodiments where MMVF based material is used in or for the shock absorbing layer 38A, which may be a coherent plate comprising at least one coherent layer, it can comprise man-made vitreous fibres (MMVF) bonded with a cured binder composition. The man-made vitreous fibres (MMVF) can be glass fibres, ceramic fibres, basalt fibres, slag wool, stone wool and others, but are usually stone wool fibres. Stone wool generally has a content of iron oxide at least 3% and content of alkaline earth metals (calcium oxide and magnesium oxide) from 10 to 40%, along with the other usual oxide constituents of MMVF. These are silica; alumina; alkali metals (sodium oxide and potassium oxide) which are usually present in low amounts; and can also include titania and other minor oxides. Fibre diameter is often in the range of 3 to 20 μm, preferably 3 to 5 μm.

The layer is preferably in the form of a coherent mass of MMVF i.e. a MMVF substrate. That is, the coherent layer is generally a coherent matrix of MMVF fibres bonded with a cured binder composition, which has been produced as such, or has been formed by granulating a slab of MMVF and consolidating the granulated material.

The present shock absorbing layer, which can also be referred to a shockpad, containing MMVF can have the advantage of being more environmentally friendly than shockpads made from plastic, foam, rubber or polymeric material.

The hydrophilicity of a shock absorbing layer, such as a sample of MMVF substrate or a foam can be measured by determining the sinking time of a sample. For example, a sample having dimensions of 100×100×15 mm to 100×100×40 mm is required for determining the sinking time. A container with a minimum size of 200×200×200 mm is filled with water. The sinking time is the time from when the sample first contacts the water surface to the time when the test specimen is completely submerged. The sample is placed in contact with the water in such a way that a cross-section of 100×100 mm first touches the water. The sample will then need to sink a distance of just over 65 mm in order to be completely submerged. The faster the sample sinks, the more hydrophilic the sample is. A sample such as an MMVF substrate is considered hydrophilic if the sinking time is less than 240 s. Preferably the sinking time is less than 100 s, more preferably less than 60 s, most preferably 50 s. In practice, an MMVF substrate may have a sinking time of 50 s or less.

Preferably the water holding capacity of the coherent layer is at least 50% of the volume of the coherent layer, preferably at least 60%, most preferably at least 70%. The greater the water holding capacity, the more water can be stored for a given coherent layer volume.

Preferably the amount of water that is retained by the coherent layer when it emits water is less than 20% vol, preferably less than 10% vol, most preferably less than 5% vol based on the volume of the coherent layer. The water retained may be 2 to 20% vol, such as 5 to 10% vol. The lower the amount of water retained by the coherent layer, the greater the capacity of the coherent layer to take on more water.

Preferably the buffering capacity of the coherent layer, that is the difference between the maximum amount of water that can be held, and the amount of water that is retained when the coherent layer gives off water, is at least 60% vol, preferably at least 70% vol, preferably at least 80% vol. The buffering capacity may be 60 to 90% vol, such as 60 to 85% vol based on the volume of the coherent layer. The advantage of such a high buffering capacity is that the coherent layer can buffer more water for a given volume, that is the coherent layer can store a high volume of water when required, and release a high volume of water into the surrounding ground once the has ground dried out. The buffering capacity of MMVF based material as discussed is so high because MMVF substrate requires a low suction pressure to remove water from the MMVF coherent layer.

The water holding capacity, the amount of water retained and the buffering capacity of the coherent layer can each be measured in accordance with EN 13041-1999.

Preferably, the shock absorbing layer 38A is substantially free from oil. By this, it is meant that the coherent layer comprises less than 1 wt % oil, preferably less than 0.5 wt % of oil. Most preferably the coherent layer is free from oil. By this it is meant that the coherent layer has 0 wt % of oil.

Oil is typically added to MMVF substrates which are to be used for purposes such as sound, insulation, thermal insulation and fire protection.

Hydrophilicity of the shock absorbing layer 38A may be defined by the hydraulic conductivity. Preferably, the at least shock absorbing layer has a hydraulic conductivity of 5 m/day to 200 m/day, preferably 10 m/day to 50 m/day. Hydraulic conductivity is measured in accordance with ISO 17312:2005. The advantage of this hydraulic conductivity is that the shock pad can absorb excess water and transfer it away from the sports field with sufficient speed to prevent flooding. As discussed above, this may be achieved by having a shock absorbing that is free from or substantially free from oil. The binder composition may be hydrophobic or hydrophilic, as defined above.

The at least one shock absorbing layer may be made by any of the methods known to those skilled in the art for production of MMVF products. In general, a mineral charge is provided, which is melted in a furnace to form a mineral melt. The melt is then formed into fibres by means of centrifugal fiberisation e.g. using a spinning cup or a cascade spinner, to form a cloud of fibres. These fibres are then collected and consolidated. Binder is usually added at the fiberisation stage by spraying into the cloud of forming fibres. These methods are well known in the art.

In any of the embodiments, the shock absorbing layer 38A may comprise only one layer. In any of the embodiments, the shock absorbing layer 38A may comprise at least two layers: a first layer and a further layer. In an embodiment, discussed only by way of example, the at least one layer can have a thickness of about 15 mm and a density of about 275 kg/m$^3$; and the further layer can have a thickness of between about 5 to 8 mm and a density of about 235 kg/m$^3$. The advantage of such embodiment can be that durability of the shock absorbing layer 38A can be improved whilst meeting the requirements for sports performance (e.g. shock absorption and energy restitution). In such embodiment for example the upper layer improves durability and the lower layer optimises the shock absorption and energy restitution.

Sports field structures according to the disclosure can have the advantage that loads and forces provided on top thereof are distributed over relatively large areas, allowing higher loads and forces without becoming unlevel or uneven. Especially when the shock absorbing layer or layers is/are provided with an upper anchor lower membrane 70, 71 as discussed, for distribution loads and forces resulting from point loads. An area of the disclosure can provide for suitable and substantially constant supply of water without the risk of over saturation and without the necessity of mechanical means for irrigation. A sports field area according to the disclosure can have the advantage that a substructure can be protected, and that an area can be provided on substantially all kinds of substructures, permanently or temporarily. A sports area according to the disclosure can have the advantage that the base element or module can provide for flexibility and/or damping for for example people or animals trafficking the area, such as on sports fields, crowded areas such as at festivals or other such places. Sports fields according to the disclosure can have the advantage that they can be used on straight and sloping surfaces, can be formed quickly using any suitable substrate as a wick medium and allows for optimisation of cooling and/or heating. Sports field structures according to the description can have the advantage that locally wetting can be optimised, for example by adaptation of the distribution of channels filled with wick medium and/or adaptation of the wick medium in said channels.

In a sports field or sports field area according to the present disclosure a water balance can be provided between one or more storage tanks 100, the capillary system of wick elements or material 38B in the pillars and the top layer 34, 38A and the sports surface, and/or an air layer within the volume V. A surplus of water, for example due to rain can be transported into the volume V through the shock absorbing layer 38A and wick material or elements 38B, and if necessary into a tank 100, whereas when the layer 38A is drying, for example due to evaporation of water, water can again be replenished.

In sports fields having an artificial cover layer 41, it may be desirable to substantially saturate the top layer 38A and/or layer 34 and/or the cover layer, if evaporation of water from the cover layer 41 is desired. In general providing more water close to and preferably directly below or at the surface of the cover layer 41 will allow more water to evaporate and thus cool more. During cold periods the distribution and especially circulation of relatively warm water and/or relatively warm air, compared to the air temperature above the field and/or the field temperature, through the structure formed by the modules 10 and/or the layers may keep the temperature of the field elevated above a freezing temperature, such that freezing of the field and/or setting of snow or ice can be prevented and the field can for example be kept in a condition for it to be played on. In order to be able to circulate the air through the modules an air vent or similar air moving devices can be provided.

In the present invention a water supply 60 can be provided, for example connecting a water storage 100 and/or a water mains 105 to the one, some or all of the voids in the base structure. A pump 102 or such forcing means can be provided in a feed and/or return line 101, 103 such that water can be forced into and/or forced out of said void or voids. Thus the water level in and/or flow of water into and/or through the void or voids can be controlled. Moreover a cooling and/or heating device 64 could be provided for cooling and/or heating water used in said sports field structure.

In the embodiments disclosed the wick medium and/or wick element is discussed and disclosed as provided in a column. Alternatively or additionally a wick element and/or wick medium could be provided in a different manner. For example a wick element could be provided as a flexible wick such as a piece of fabric, extending through an opening in the deck and hanging into the void.

In embodiments natural grass can be used as a surface forming material or part thereof, which can for example grow in a layer of growing substrate such as sand or turf on the shock absorbing layer, or can grow directly into the shock absorbing layer. The present invention is by no means limited to the embodiments specifically disclosed in the drawings and description. Many variations are possible within the scope as defined by the claims. For example all combinations of parts of the embodiments shown in the drawings are considered to have been disclosed too. Base elements or modules as disclosed can be made by any methods and from different materials. Modules can be coupled in different manners and different ways or can be placed next to each other without coupling. They can be positioned in different orientations relative to each other, for example in a "half-stone", staggered relationship for even more rigid connections. Modules can be stacked for obtaining a larger internal volume V in the structure. The modules can have different shapes and dimensions, for example polygonal. Preferably they can be coupled such that they can form a substantially continuous surface area. These and many such variations are considered falling within the scope of the claims.

The invention claimed is:

1. A sports field, comprising a base structure and a cover, wherein the cover is at least partly permeable to at least water, wherein the cover comprises a top layer and a shock absorbing layer provided between the top layer and the base structure, wherein the shock absorbing layer has an upper surface and a lower surface and comprises at least one of man made vitreous fibres (MMVF) bonded by a cured binder or a cell foam, wherein the shock absorbing layer has a thickness between the upper surface and the lower surface of between 12 and 40 mm and has a density of between 175 $kg/m^3$ and 300 $kg/m^3$, wherein the shock absorbing layer is hydrophilic, such that it can absorb a volume of water of between at least 20 to 95% of the volume of the shock absorbing layer.

2. The sports field according to claim 1, wherein the shock absorbing layer comprises 1.0 wt % to 6.0 wt % of cure binder composition, wherein the cured binder composition is hydrophilic.

3. The sports field according to claim 1, wherein the shock absorbing layer comprises or is made of at least one of substantially open cell foam and cell foam comprising fibers extending across cells.

4. The sports field according to claim 1, wherein at least one of the cover and the shock absorbing layer has a shock absorbing capacity of between 30% and 70% and has an energy restitution of between 30% and 55%.

5. The sports field according to claim 1, wherein the shock absorbing layer comprises at least two layers of material comprising vitreous fibres, which layers are hydrophilic.

6. The sports field according to claim 1, wherein the base structure is placed on a substructure, which substructure is watertight and at least partly slopes towards at least one of a water storage and a water transport facility.

7. The sports field according to claim 1, wherein the shock absorbing layer has an upper membrane bonded to the upper surface and a lower membrane bonded to the lower surface.

8. The sports field according to claim 7, wherein the upper membrane and the lower membrane are water permeable.

9. The sports field according to claim 7, wherein at least one of the upper membrane and the lower membrane comprises glass fibres, polymer fibres or a mixture thereof.

10. The sports field according to claim 9, wherein the at least one of the upper membrane and the lower membrane is formed as a mesh layer.

11. The sports field according to claim 1, wherein the base structure comprises voids for containing fluid, wherein the base structure forms a substantially continuous deck supporting the cover, wherein the top layer is formed by a sports layer, at least a number of said voids being in fluid communication with each other, and wherein wick elements are provided fluidly connecting at least a number of said voids with said cover for supplying fluid from said voids to said top layer.

12. The sports field according to claim 11, wherein the wick elements are at least partly formed by or in elements of the base structure.

13. The sports field according to claim 11, wherein the cover is permeable to water, such that water provided from the voids can pass through the cover and evaporate therefrom, cooling at least one of the cover and a surface of the cover.

14. The sports field according to claim 11, wherein the material of the at least one shock absorbing layer of the cover is at least partly the same as the material of the wick elements.

15. The sports field according to claim 11, wherein the sports layer is an artificial sports layer.

16. The sports field according to claim 11, wherein the sports layer is or comprises artificial grass.

17. The sports field according to claim 11, wherein the wick elements are provided in support elements of the base structure.

18. The sports field according to claim 1, wherein base modules of the base structure are placed on top of a substructure, which substructure is fluid tight.

19. The sports field according to claim 18, wherein the base modules of the base structure are connected to a flushing device for flushing at least one of fluid and gas into said base modules or from said base modules or into and from said base modules.

20. The sports field according to claim 1, wherein the cover is provided on a membrane.

21. The sports field according to claim 20, wherein said membrane is a membrane bonded to the upper surface of the shock absorbing layer.

22. A method for forming a sports field, wherein a base structure is formed on which a shock absorbing layer is provided, on top of which shock absorbing layer a top layer forming a sports layer is placed or formed, wherein as a shock absorbing layer an integral layer or combination of layers is used having a density of between 175 $kg/m^3$ and 350 $kg/m^3$, and a thickness between 12 and 40 mm is used, wherein the shock absorbing layer or combination of layers is hydrophilic.

23. The method according to claim 22, wherein as a shock absorbing layer an integral layer or combination of layers is used comprising at least one of manmade vitreous fibres and a cured binder composition and a cell foam.

24. The method according to claim 22, wherein as a shock absorbing layer an integral layer or combination of layers is used comprising open cell foam.

25. The method according to claim 22, wherein a series of modules is placed on a substructure forming the base structure, said modules comprising a deck and columns opening into said deck, wherein a series of said columns is filled at least partly with a wick medium, and wherein the water retaining, shock absorbing layer is brought in fluid connection with the wick medium in the or each column filled at least partly with said wick medium, and wherein water is provided or retained in said modules for wetting at least part of the shock absorbing layer on top of the modules through the wick medium in said columns.

26. The method according to claim 25, wherein the modules are coupled in at least one of rows and columns.

27. The method according to claim 25, wherein a membrane is positioned on or over the decks of the modules, the shock absorbing layer being provided on top of or comprising the membrane.

28. The method according to claim 27, wherein during use water can flow into the shock absorbing layer from the wick medium or vice versa through the membrane.

29. A method for operating a sports field having a sports layer provided on top of a shock absorbing layer, wherein during use the water content of the shock absorbing layer is regulated between 20% and at least 95% in volume of the volume of the shock absorbing layer.

30. The method according to claim 29, wherein the sports field is a sports field according to claim 1.

31. The method according to claim 29, wherein the water content of the shock absorbing layer is regulated between 30% and 95%.

32. The method according to claim 29, wherein the water content of the shock absorbing layer is regulated between 40% and 95%.

33. The method according to claim 29, wherein the water content of the shock absorbing layer is regulated between 50% and 95%.

* * * * *